United States Patent [19]

Coudurier et al.

[11] Patent Number: 5,035,623

[45] Date of Patent: Jul. 30, 1991

[54] PLANETARIUM

[75] Inventors: Pierre Coudurier, 27, rue Balay, 42 000 Saint-Etienne; Pierre Boutte, Fraisses; Patrick Romeuf, Sorbiers; Paul Tronchon, Chozeau; Michel Auffranc, Dargoire, all of France

[73] Assignees: Groupement Pour L'Automatisation de la Production Gap; Pierre Coudurier, both of Saint Etienne, France

[21] Appl. No.: 539,318

[22] Filed: Jun. 14, 1990

Related U.S. Application Data

[63] Continuation of Ser. No. 277,124, Nov. 29, 1988, abandoned.

[30] Foreign Application Priority Data

Dec. 3, 1987 [FR] France .................. 87 17359

[51] Int. Cl.⁵ .......................................... G09B 27/00
[52] U.S. Cl. .................................................. 434/286
[58] Field of Search ............. 434/284, 285, 286, 287, 434/288

[56] References Cited

U.S. PATENT DOCUMENTS

| | | | |
|---|---|---|---|
| 1,693,969 | 12/1928 | Villiger et al. | 434/286 |
| 2,827,827 | 3/1958 | Spitz | 434/286 |
| 3,256,619 | 6/1966 | Frank | 434/286 |
| 3,470,629 | 10/1969 | Kittredge et al. | 434/286 |
| 3,863,363 | 2/1975 | Miyajima | 434/286 |

*Primary Examiner*—William H. Grieb
*Attorney, Agent, or Firm*—Eric P. Schellin

[57] ABSTRACT

This planetarium is remarkable in that it comprises a sphere (5) consisting of two separate hemisphere (1-2) with diametrically opposed planes facing each other, defining between them a space (e) which can be varied as required, the said hemispheres being joined together by means of connection located at their centre, these being attached to a means (6) located between the two hemispheres, having at least a fixing function in relation to a supporting structure, the said hemispheres being capable, by virtue of their supports, of assuming different positions along the 3 geometrical axes, without any encroachment by the said structure during the projection of the flux onto the vault; the said hemispheres being equipped with means permitting the projection of a luminous flux onto the vault of the planetarium room, and means (11-T) representing certain celestial bodies.

9 Claims, 2 Drawing Sheets

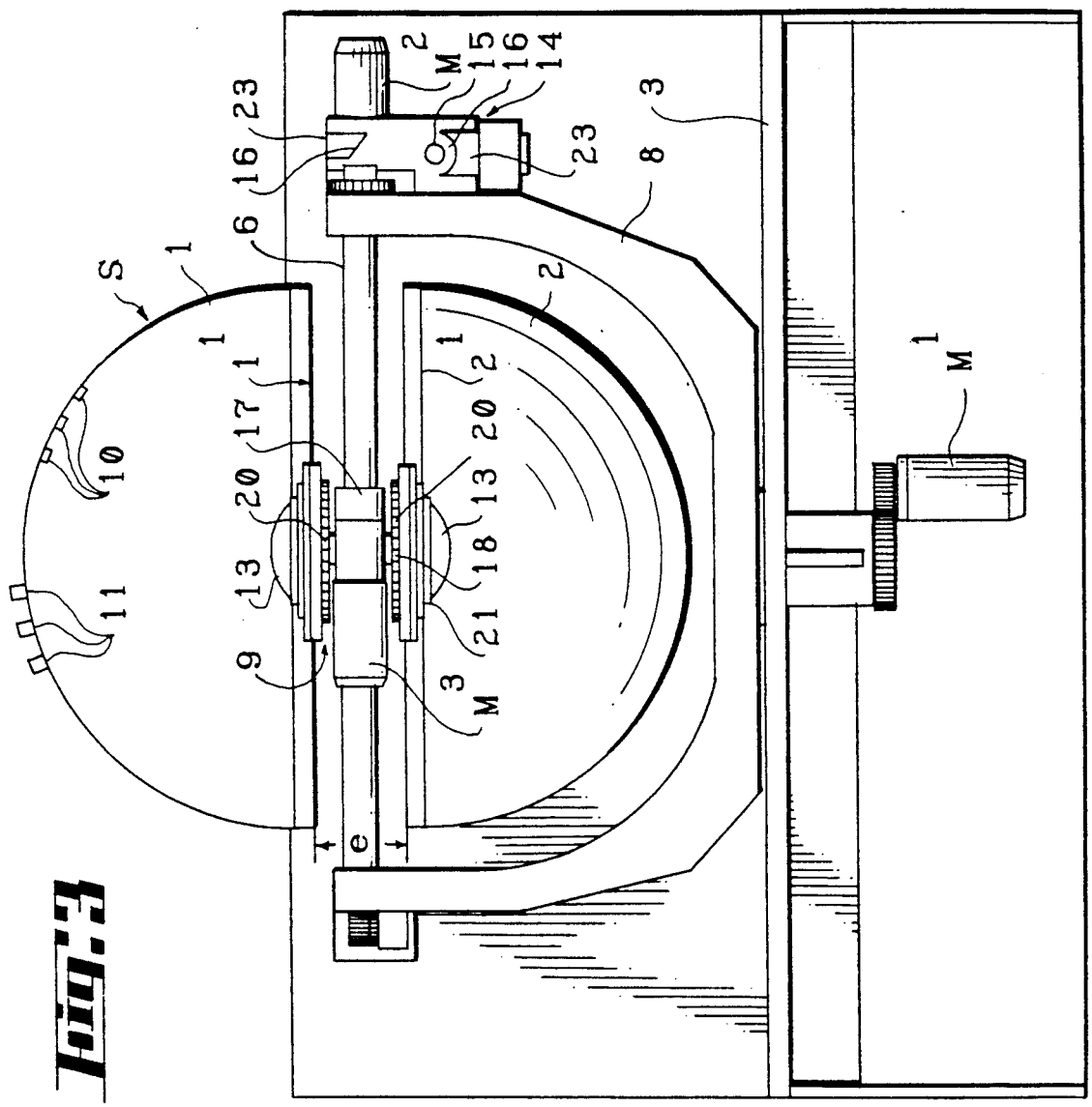

PLANETARIUM

This application is a continuation of application Ser. No. 277,124, filed Nov. 29, 1988, now abandoned.

The object of the invention is a planetarium.

It is recalled briefly that the object of a planetarium is to simulate the various movements of the stars in the sky across a generally hemispherical vault.

One is already familiar with numerous patents describing planetaria, such as those developed by Spitz, Zeiss and others. They are generally of a high standard, with a generally highly complex structure and therefore have a high cost, which has until now limited their widespread use in view of the investment involved.

To the current knowledge of the applicants, there are, for example, in France only three planetaria of the above-mentioned type which are working and are installed in much frequented places which are essentially of a scientific nature. Planetaria have an obvious scientific application and are also of great benefit for education, training and teaching. In the light of present conditions, they can only be discovered by a very small proportion of the population, under often highly specialised conditions, in a more global environment.

In view of the extent of the needs established and with a desire to promote knowledge and real continuous training, the applicants deemed it necessary to develop a new type of planetaria whose structure would be simpler and cheaper, requiring less inventment, while possessing a high degree of reliability and scientific accuracy.

Therefore, the aim sought in accordance with the invention was to design a new planetarium which met the objectives envisaged and which could be used equally with horizontal and hypospherical (inclined) hemispherical vaults.

Moreover, with regard to existing planetaria in accordance with the prior art, another aim sought in accordance with the invention was to find a mechanism which did not conceal the spheres of radiation during the different movements so that the change in the celestial vault can be followed during the diurnal and nocturnal phases.

In accordance with an initial characteristic, the planetarium consists of a sphere consisting of two separate hemispheres with diametrically opposed planes facing each other which, between them, define a space which can be varied as required, with the said hemispheres being joined together by means of connection located in their centre, which are attached to a means located between the two hemispheres, having at least a fixing function in relation to a supporting structure, with the said hemispheres being capable, by themselves and through their means of support, of assuming different positions along the geometrical axes, without any encroachment of the said structure during the projection of flux onto the vault, with the said hemispheres being equipped with means permitting the projection of a luminous flux onto the vault of the planetarium room, and means representing certain celestial bodies.

These and other characteristics will emerge clearly from the rest of the description.

In order to define the object of the invention illustrated in a non-limitative way, figures are shown in the drawings where:

FIG. 3 is a large-scale view according to FIG. 2 of the planetarium in accordance with the invention, with a partial section illustrating the different main components conferring originality.

Figure 1:
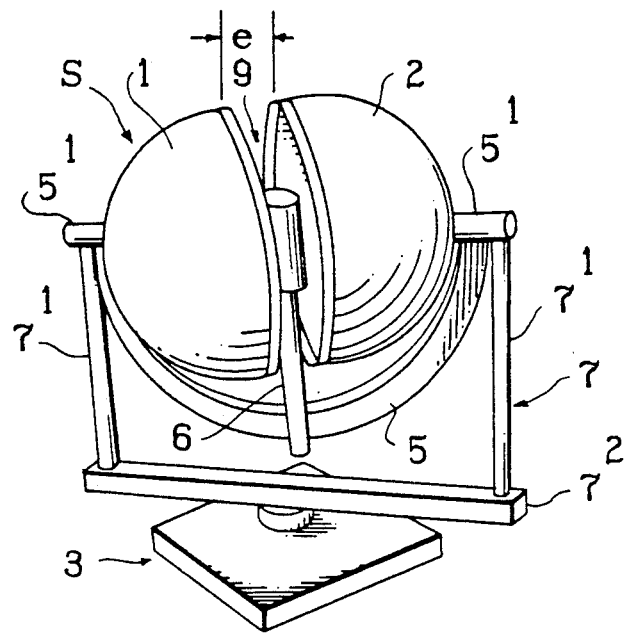
FIG. 1 is a perspective view showing in diagrammatic form the supporting structure of the planetarium in accordance with the invention in an initial embodiment, marking the different directions of rotation of the constituent elements of the planetarium.

In order to present the object of the invention in more concrete form, the following is a non-limitative description illustrated by the figures in the drawings.

The planetarium according to the applicants is designed to operate in a room equipped with a hemispherical vault of around 8 to 15 meters in diameter. It consists of three main modules, the sphere (S) taken as a whole, the luminous lamps (T) and a control module. A working software package permits the creation and production of animated scenes.

More particularly, in accordance with an original feature of the invention, the sphere is formed by two separate, opposed hemispheres (1-2) which are joined together and which are moved by the action of a motor along three axes, as described below, by means of a very special supporting structure; the two hemispheres have their planes diametrically opposed in accordance with a space (E) which is adjustable according to the position of the planetarium in a room with reference to the distances of the hemispherical vault, in order to maintain a single representation on the vault for the same point.

The supporting structure consists of a pedestal forming the base (3) with a streamlined protective peripheral casing (4) which also creates certain esthetics.

Following on from the above-mentioned base, mounted directly or in an detachable manner, there is a yoke (5) in the form of a semi-circle surrounding the two hemispheres, with the said yoke supporting the two above-mentioned hemispheres (1-2) by additional means, the objective being that, by virtue of the circumspect mounting of these hemispheres, no mechanical, structural or other means encroaches on the space "e" defined between them, leaving the representation of the heavenly vault free.

As shown in the figures, the two hemispheres (1-2) are joined together at the centre by means of support with, in particular, an initial linking function which will be described later. They comprise, in particular, as illustrated in an initial embodiment, FIG. 1, a tubular rod with an initial linking function (6) with a fixed position, passing between two hemispheres, whose point of attachment is fixed to the centre of the yoke (5), forming a radius with regard to the said yoke, with the two hemispheres then being positioned in their vertical diametral plane. In this case, the free ends (5.1) of the yoke pivot freely on the vertical legs (7.1) of a U-shaped stirrup support (7), the bottom (7.2) of which is joined to the base (3) of the structure, while still rotating freely in the horizontal plane. In this design, one thus defines two movements controlled by motors (M1-M2) permitting respectively the pivoting of the yoke in relation to the base with a horizontal sweep, and the tilting of the two hemispheres by means of the circular movement of the yoke in relation to the horizontal axis given by its points of attachment and fixing points. In order to do this, in this design, the motor (M1) is detachable and fixed by any appropriate means to the base and moves the stirrup (7) via an appropriate transmission system, while the motor (M2) is joined to one of the vertical legs of the stirrup (7) supporting the yoke and controlling the direction of the latter.

Figure 2:
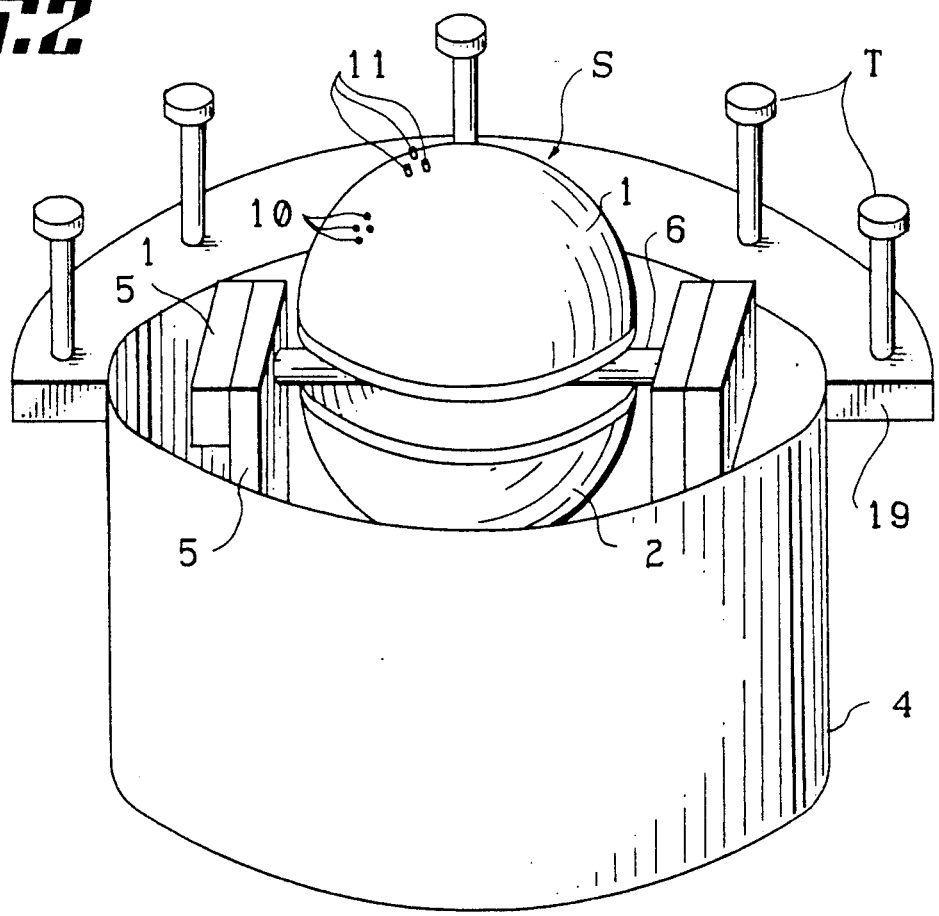
FIG. 2 is a perspective view illustrating the planetarium in accordance with the invention, in a second embodiment, protected within a casing with an arrangement of luminous lamps, also marking the different directions of rotation.

In the embodiment in FIG. 2, as a variant, while retaining the same concept of non-concealment of the space (e) between the two hemispheres during the different movements, the yoke (8) is fixed directly to the base (3) while still being able to rotate and sweep in the horizontal plane, controlled by a motor (M1). The two hemispheres are located with their diametral plane horizontal; the two hemispheres tilt in relation to and all the way round the above-mentioned horizontal axis under the control of the motor (M2) fixed by appropriate means to one of the legs of the yoke. A rod or tube providing an initial linking function (6) joins the means of support of the two hemispheres to the yoke.

A third motor (M3) is provided to rotate the hemispheres (1-2) about themselves. This third motor is fixed in relation to the intermediate means of connection between the two hemispheres (1-2). The combination and operation of the three motors (M1-M2-M3) permits orientation according to the three geometrical axes in space, permitting the representation of all the movements of the stars at all times.

Motor (M1) gives the movement at the pole, motor (M2) the movement for the change in latitude and motor (M3) the diurnal movement.

Illustrated in this way, the two hemispheres comprise a metal outer shell and are joined at the centre of their diametral face to means of support (9) taken as a whole. The latter are designed particularly to take and permit, by means of built-in bearings and rollers (20) or similar devices, the rotation of the hemispheres about themselves, while transmission systems, not illustrated, permit the transfer of the movements from the motor (M3) to the said hemispheres, in accordance with well-known mechanical arrangements.

The hemispheres are drilled with a total of around 3,000 holes (10), each corresponding to an existing star, with the representation of the specific bodies being taken into account by a system of optical lenses (11) detachable and fixed by any appropriate means—bonding, etc.—to the periphery of the said hemispheres, in the desired places.

These lenses, numbering around fifty for example, but not limited to this amount, represent the 50 brightest stars, the Milky Way and several heavenly objects. By being magnified, they make it possible to represent on the vault illuminated points or areas of larger section. A luminous flux passes through the two hemispheres (1-2) and strikes the hemispherical vault: this flux can only pass through the drilled holes (10) and the said lenses (11). This luminous flux has its origin in a source and is distributed in each hemisphere by means of a special lens (13) attached to each hemisphere. According to FIG. 3, the said lenses, which are convex, are fixed in any appropriate way by means of linking (21) and fixing to the diametral faces (1.1-2.1) of the two hemispheres and to the central means of support.

In accordance with an initial design, the light source is connected to an optical reflector which is shown in FIG. 3. It is also of the same design for the embodiment in FIG. 1. In this design, a casing (14) or similar item of parallelepipedic or other form is fixed to the yoke (8) and internally equipped to receive a lamp (15) whose light is reflected by one or more appropriately shaped lenses (16) mounted on suitable supports (23). The luminous flux transmitted is then projected inside the tubular connecting rod (6) whose second function is to transfer the luminous flux to an integral sphere (17) known in the trade and represented by short dashed lines. The latter has, opposite the central axis of each hemisphere and perpendicular to the diametral plane, a hole or port (18) transmitting to each hemisphere (1-2) a luminous flux which is amplified and distributed by the multiple lens (13). The unit designed in this way provides excellent distribution of the luminous flux. The optical light source has several advantages in that it is simple and permits rapid intervention and change when the transmitting lamp is destroyed or when one wishes to change the lenses (16).

In a second design, the light source can be attached directly to the integral sphere (17).

Thus the light source comprises the above-mentioned optical lenses (11) representing certain stars or heavenly bodies, as well as lamps (T) representing the planets and the sun. These lamps (T) have their own optical system and a separate low-power light source. These lamps are, for example, mounted on a ring (19) surrounding the protective casing of the planetarium (FIG. 2), which thus serves as a support; the said ring can be moved in a horizontal circular direction by any appropriate means of control and guiding as described and illustrated in detail. These lamps are themselves given a directional movement by an appropriate mechanism.

For the operation of the planetarium thus described, one uses a control module comprising a system of electronic boards controlling and coordinating the movements of the unit, with each element consisting of either a lamp (T), an optical lens (11) or holes (10) made in the two hemispheres representing one of the heavenly bodies.

The planetarium described in this way has great flexibility of use and allows the universe to be represented from any point in the solar system.

In addition, an operational software package allows the planetarium to operate in the show creation, automatic show and manual show modes.

The advantages of the invention are obvious; in particular, one would emphasise the simplicity of the planetarium and the absence of the risk of concealment of the peripheral space surrounding the two hemispheres, since the movements of the supporting structure are fully integrated.

What is claimed is:

1. A planetarium comprising a base support, a protective housing and a carrier structure means, a sphere constituting two hollow hemispheres having diametric planes being opposed and facing one another, said hemispheres having integration means with one another in the central part of their diametric planes by a first support means, thereby assuring their connection, said support means including a link means located between the two hollow hemispheres thereby assuring a fixation function in relation to a carrier structure means, said hollow hemispheres being rotatable themselves relative to said second support means, said hollow hemispheres being arranged with lens means representing certain celestial bodies other than the planets, the hollow hemispheres including a single luminous source whereby to project said luminous flux represented in a divided fashion simultaneously in the two hemispheres, light means representing the planets are located on an external ring integral with said protective housing of said carrier structure means, which ring is adapted and constructed to rotate in a horizontal plane, said light means having optical means orientable relative to said base support.

2. The planetarium according to claim 1, wherein the carrier structure comprises in particular an arc means exhibiting a semicirular form which surrounds the two hollow hemispheres externally and is adapted and constructed to support the two hemispheres.

3. The planetarium according to claim 2, wherein the carrier structure includes a said base support having a protective arc means, which arc means is fixed in a freely rotating manner and having a motor operatively connected thereto.

4. The planetarium according to claim 3, wherein the integration means between the two hemispheres comprises a connecting means thereby achieving a first connecting function in a fixed position between the two hollow hemispheres and whose attachment point is fixed on the median part of the arc means, the ends of said arc means are associated in a freely pivoting fashion on vertical branches with support in the form of a U whose base is integrated with the bottom of the structure while retaining a freedom of rotation in the horizontal plane controlled by said motor.

5. The planetarium according to claim 3, wherein the integration means between the two hemispheres comprises in connecting means which assures a first connecting function in a fixed position between the two hollow hemispheres and whose attachment point is fixed to one of the vertical branches of the arc means, which latter is integrated to the bottom with the capacity of moving in rotation in the horizontal plane controlled by the said motor.

6. The planetarium according to claim 4, wherein a second motor is operatively mounted whereby to permit the tilting of the arc means about a diametric axis connecting the said ends.

7. The planetarium according to claim 5, wherein the second motor is operatively mounted whereby to permit the tilting of the arc means about a diametric axis connecting its said ends.

8. The planetarium according to claim 1, wherein the two hollow hemispheres rotate on themselves under the action of a third motor integral with the connecting means for connecting the two hemispheres to one another including transmission and rolling means.

9. The planetarium according to claim 1, wherein the luminous flux issues from optical means of emission and of transmission which optical means is fixed relative to said carrier structure, and that the link means transfers and divides said flux by optical means the two hollow hemispheres, said two hollow hemispheres having a plurality of apertures and optical lenses through which the flux is projected thereto, an objective lens having a convex form being fixed to said diametric faces of each hemisphere to thereby divide the luminous flux in the hemispheres.

* * * * *